Aug. 5, 1952 — L. PATELLA — 2,605,757
MULTIBLADES FRAME FOR SAWING MARBLE AND OTHER
MATERIALS OF CONSTRUCTIVE UTILITY

Filed Dec. 17, 1946 — 3 Sheets-Sheet 1

Inventor.
Luigi Patella
By
Attorney.

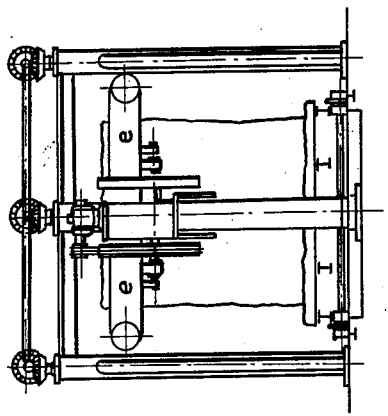
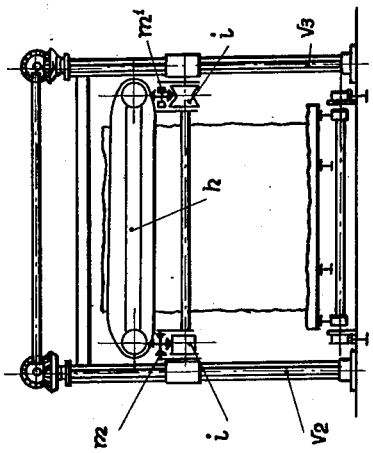
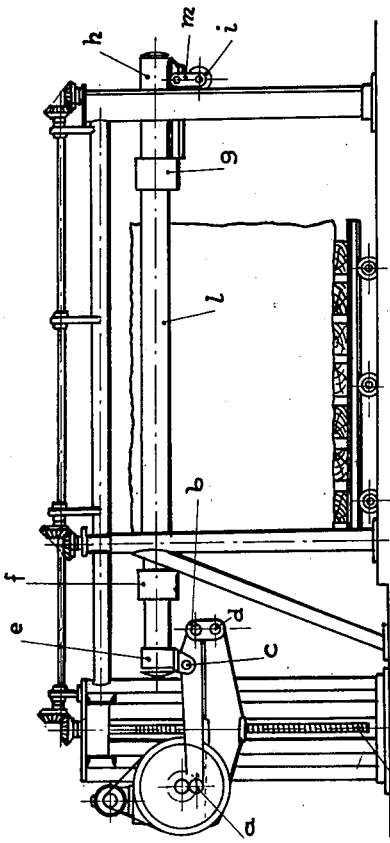
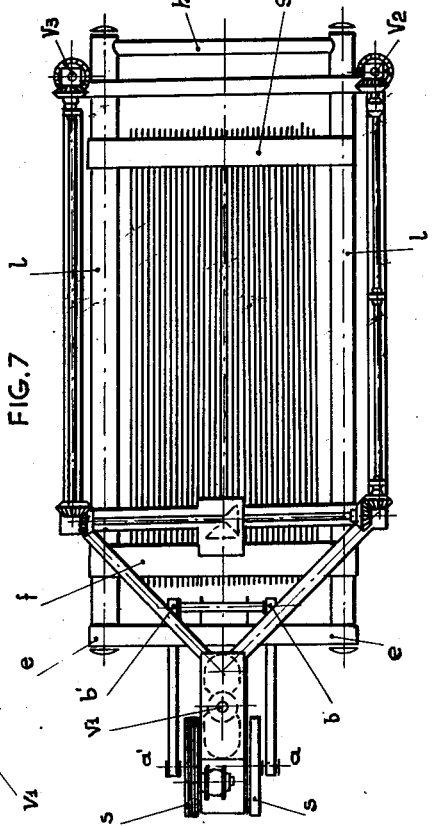

INVENTOR.
Luigi PATELLA

BY

ATTORNEY

Patented Aug. 5, 1952

2,605,757

UNITED STATES PATENT OFFICE 2,605,757

MULTIBLADES FRAME FOR SAWING MARBLE AND OTHER MATERIALS OF CONSTRUCTIVE UTILITY

Luigi Patella, Milan, Italy

Application December 17, 1946, Serial No. 716,776
In Italy December 22, 1945

5 Claims. (Cl. 125—17)

An improvement in multiblade frames or gang-saws for marble and other materials of constructive utility is known, in which only one of the ends of the frame moves alternately through an arc of a circle convex towards the bottom, whilst the other, more particularly the driving end, describes an ovoidal curve.

In such a system the curve which characterizes the working stroke was greater than the curve of the return stroke, whilst as regards useful sawing work the reverse condition is favourable. There further existed a considerable divergence between the shape of the head portion of the curve (driving side) of the blades and that of the crescent-shaped tail portion, which did not assure complete uniformity of the cut.

Moreover, on account of the limited arc of contact between the separate points of the blades and the bottom of the cut, and the necessity for sufficient lifts of the frame at the end of each stroke, it was necessary to use long strokes, as in the typical pendulum trajectory frame. But long strokes, other conditions being equal, increase the parasitical influence of the alternating forces of inertia, already very high in this class of machines.

It has now been discovered that for the various points of the blades an entirely different path of travel can be used for the useful sawing purposes, from those until now proposed, which is more particularly characterised by a lower working portion of such wide curvature as to identify itself with a rectilinear segment, and by a curved upper idle return portion. The upper portions of the stroke are very similar to each other. This affords carrying of the abrasive material in one direction only.

The invention will now be described more in detail and with reference to the accompanying drawings.

In the drawings,

Fig. 6 is a side elevation similar to that of Fig. 1 of the entire machine,

Fig. 7 is a top view of the same, and

Figs. 8 and 9 are side end views thereof.

Figure 2:
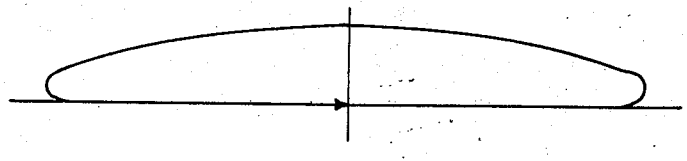
Figs. 2 to 5 are diagrams illustrating several paths of travel of the cutter.
Figure 3:
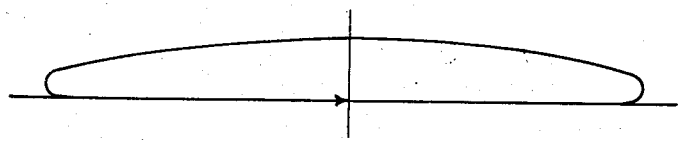
Figure 4:
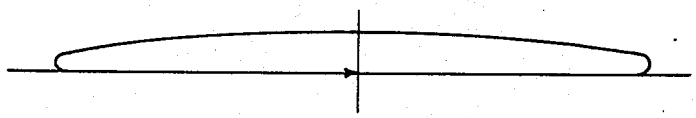
Figure 5:
Figure 10:
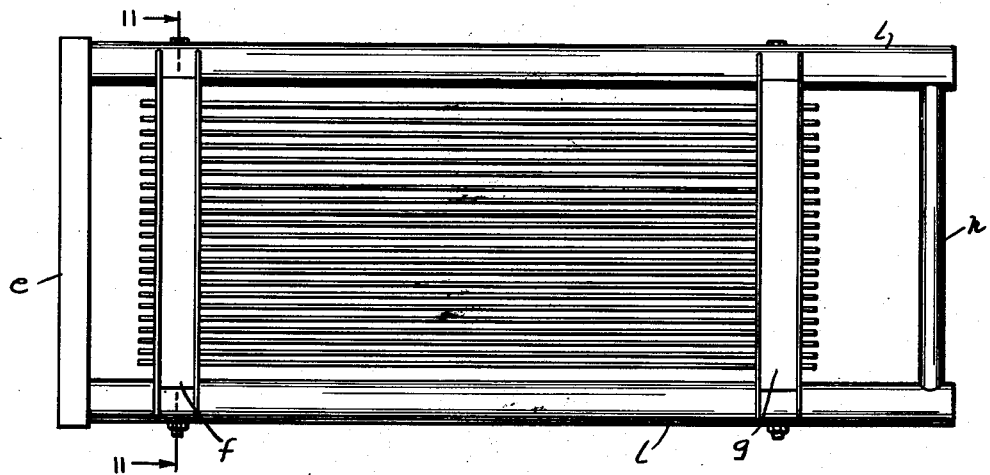
Fig. 10 is an enlarged plan view of the saw frame.
Figure 11:
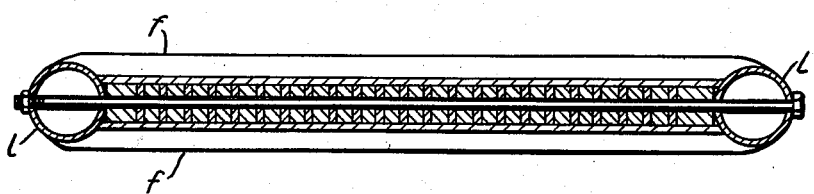
Fig. 11 is a view taken on a vertical plane passing transversely through the saw frame shown in Fig. 10.

The above is clearly shown in Figs. 2 to 5, which represent, in full size, the path of travel of different points of the blades, Fig. 2 showing a head end path (driving side), Fig. 5 a tail end path, and Figs. 3, 4 paths of intermediate equidistant points.

Figure 1:
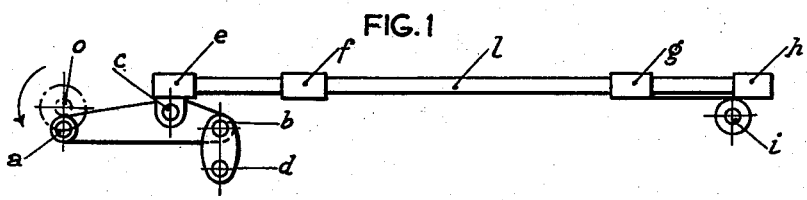
Fig. 1 is a side elevation of the cutter carrying frame.

It is further obvious that the upper and lower portions of the curves perfectly merge into each other, the curve being represented by a continuous function, of which the parametric equations are expressed by $$X=(l-m)\ r\cos\theta+ma\cos\varphi\ mn$$
$$Y=(l-m)\ r\sin\theta+ma\sin\varphi$$

in which $r$ indicates the crank (radius $oa$ in Fig. 1 representing the kinematic diagram of the system realized by the present invention), $m$ the relation to $c/cb$ of the two segments of the driving connecting rod $ab$; $n$ the distance of the fixed points $o$, $d$; $a$ the length of the crank $bd$; $\theta$ is the anomaly of the radius $oa$, and $\varphi$ is the anomaly of the crank $bd$.

In the same Fig. 1, the terminal head $e$ of the blade-carrying frame is articulated to an intermediate point $c$ of the connecting rod $ab$, whilst the terminal head $h$ runs on two rollers $i$. The blade tensioning cross members are shown at $f$ and $g$.

It should be noted how, for the purpose of sawing efficiency, the trajectories lying between $f$ and $g$ are used, those lying between $e$ and $f$ having been rejected on account of their lying too high up, and those lying between $g$ and $h$ because of their being flattened.

The shape of the actual frame differs from that of the conventional blade-carrying frame, inasmuch as the two side members are connected not by two cross-heads only, but by two cross-heads and two cross members acting as blade tensioners: this construction, besides being particularly favourable for the purpose of the said selection of the trajectories, imparts to the frame a most remarkable degree of stiffness.

Fig. 6 shows a practical form of the frame seen in elevation, in which the reference letters indicate the same kinematic elements as in Fig. 1; furthermore $m$ indicates a counter roller which ensures constant adherence of the main roller to the running guide above it.

Fig. 7 is a plan view of the frame; the blade-carrying frame exerts its weight not on four uprights (screws) as in the conventional frame, but on three uprights, the main one being screw $V^1$, and the two secondary ones to $V^2$ and $V^3$. The upright $V^1$ guides the driving frame in its vertical movements, the said frame being formed by a shaft carrying at its ends two flywheels $s$, $s'$, which incorporate the disc cranks driving the two adjacent connecting rods $ab$, $a'b'$, rigidly connected at their ends $bb'$. The weight of the blade carrying assembly is distributed over the two connecting rods.

Fig. 8 shows the frame as seen from the motor side; Fig. 9 shows the frame from the opposite side, $i$, $i'$ being the supporting rollers and $m$, $m'$ the associated counter rollers.

In practice the details of construction and operation, as well as the use of the present invention may vary, without departing from the scope of the invention.

I wish it to be understood that I do not desire to be limited to the exact details of construction

What I claim is:

1. A machine for cutting stones and similar objects comprising in combination a fixed supporting frame, supporting means for said object to be cut, said means being longitudinally movable in said fixed frame, a longitudinal frame movably mounted on said fixed supporting frame and including a cutter holding portion intermediate its ends, cutting means movably connected to said cutter holding portion movable therewith and extending adjacent the surface of said objects to be cut, two interconnected levers, the first lever being pivoted to a support vertically displaceable on said fixed frame and adapted to permit arcuate movement of the lever interconnecting point, said second lever comprising an operating portion and a pivot point spread from said operating portion and from said interconnecting point, a motor-driven crank mounted on bearings carried by said support connected to said operating portion and adapted to move the same in a circular path, the pivot point of said second lever being connected to a portion of said movable frame near one end thereof, antifriction means for supporting the other end of said movable frame and capable of vertical displacement on said fixed supporting frame, means for simultaneously displacing said support and said antifriction means in a vertical direction, said levers forming with said crank and said support a polygonal linkage operating system for said movable frame adapted for cooperation with said antifriction support, means to move said cutter holding portion during the working stroke in a substantially linear longitudinal path in one direction and to move the same during the idle return stroke in an opposite direction and in a curved path spaced throughout from said linear path for return to its starting position.

2. A machine for cutting stones and similar objects comprising in combination a fixed supporting frame, supporting means for said objects to be cut, said means being longitudinally movable in said fixed frame, a longitudinal frame movably mounted on said fixed supporting frame and consisting of two longitudinal members, two end cross members and two longitudinally displaceable intermediate cross members connecting said longitudinal members, a cutter, a driving mechanism for said longitudinal frame, said driving mechanism having a first lever connected to said movable frame underneath one of said end cross members and an antifrictional support means located underneath the other end cross member, said longitudinal frame including a cutter holding portion intermediate its ends, cutting means movably connected to said cutter holding portion and extending adjacent the surface of said objects to be cut, a second lever connected with said first lever, said second lever being pivoted to a support vertically displaceable on said fixed frame, said first lever comprising an operating portion and a pivot point spaced from said operating portion, a motor-driven crank mounted on bearings carried by said support connected to said operating portion and adapted to move the same in a circular path, the pivot point of said second lever being connected to a portion of said movable frame near one end thereof, said antifriction means for supporting said other end of said movable frame being capable of vertical displacement on said fixed supporting frame, means for simultaneously displacing said support and said antifriction means in a vertical direction, said levers, said crank and said support forming a polygonal linkage operating system for said movable frame adapted for cooperation with said antifriction support, said driving mechanism being capable of moving said cutter holding portion during the working stroke in a substantially linear longitudinal path in one direction and to move the same during the idle return stroke in an opposite direction and in a curved path spaced throughout from said linear path for return to its starting position.

3. In a machine for cutting stones and similar objects having a stationary frame and a movable blade carrying frame of which one end is connected to a driving mechanism mounted on said stationary frame and the other end is slidably mounted on a support mounted on said stationary frame, said driving mechanism comprising a connecting rod coupled at one end to a source of circular motion and at the other end to a swingable link pivoted on said stationary frame, the connection of said blade carrying frame with said driving mechanism being established by a link extending from the end of said blade carrying frame to said connecting rod at a point between the two ends of said connecting rod.

4. In a machine for cutting stones and similar objects having a stationary frame and a movable blade carrying frame one end of which is connected to a driving mechanism and the other end of which is slidably mounted on a support, said driving mechanism comprising a connecting rod coupled at one end to a source of circular motion and at the other end to a swingable link pivoted on said stationary frame, the connection of said blade carrying frame with said driving mechanism being established by a link extending from the end of said blade carrying frame to said connecting rod at a point between said two ends of said connecting rod.

5. In a machine for cutting stones and similar objects, a stationary frame, a movable cutter and a frame carrying said cutter, a driving mechanism connected to the one end portion of said cutter carrying frame, the latter being composed of a center portion and two end portions, a plurality of laterally spaced parallel blades forming said cutter, a lever, one of the end portions of said movable blade carrying frame being connected to an intermediate point of said lever, a motor driven crank having one end thereof connected with said lever, the latter adapted to move the end of said lever in a circular path, a link oscillatably mounted on said stationary frame and connectioned to the other end of said lever, the other end portion of said blade supporting frame being slidably carried on said stationary frame.

LUIGI PATELLA.

REFERENCES CITED

The following references are of record in the file of this patent:

UNITED STATES PATENTS

| Number | Name | Date |
|---|---|---|
| 173,709 | Young et al. | Feb. 15, 1876 |
| 364,459 | Young | June 7, 1887 |
| 423,378 | Drummond | Mar. 11, 1890 |

FOREIGN PATENTS

| Number | Country | Date |
|---|---|---|
| 280,979 | Great Britain | Nov. 23, 1927 |
| 302,536 | Great Britain | Dec. 20, 1928 |